United States Patent
Lin et al.

(10) Patent No.: US 8,503,420 B2
(45) Date of Patent: Aug. 6, 2013

(54) PHYSICAL STRUCTURE AND DESIGN OF SOUNDING CHANNEL IN OFDMA SYSTEMS

(75) Inventors: Chih-Yuan Lin, Wujie Township, Yilan County (TW); Pei-Kai Liao, Mingjian Xiang (TW)

(73) Assignee: MediaTek Inc. (TW)

( * ) Notice: Subject to any disclaimer, the term of this patent is extended or adjusted under 35 U.S.C. 154(b) by 616 days.

(21) Appl. No.: 12/655,523

(22) Filed: Dec. 30, 2009

(65) Prior Publication Data

US 2010/0165972 A1    Jul. 1, 2010

Related U.S. Application Data

(60) Provisional application No. 61/141,814, filed on Dec. 31, 2008, provisional application No. 61/142,653, filed on Jan. 6, 2009.

(51) Int. Cl.
    *H04B 7/208* (2006.01)
(52) U.S. Cl.
    USPC ............ 370/344; 370/328; 370/337; 370/329
(58) Field of Classification Search
    None
    See application file for complete search history.

(56) References Cited

U.S. PATENT DOCUMENTS

| | | | | |
|---|---|---|---|---|
| 7,342,974 | B2 | 3/2008 | Chiou ........................... | 375/260 |
| 7,417,974 | B2 | 8/2008 | Hansen ......................... | 370/334 |
| 7,936,844 | B2 | 5/2011 | Lai et al. ...................... | 375/316 |
| 7,961,806 | B2 | 6/2011 | Lin et al. ...................... | 375/262 |
| 2003/0026223 | A1 | 2/2003 | Eriksson et al. ............. | 370/335 |
| 2003/0156594 | A1 | 8/2003 | Trott et al. ................... | 370/442 |
| 2006/0094435 | A1 | 5/2006 | Thomas et al. ............... | 455/450 |
| 2006/0269007 | A1 | 11/2006 | Zhang et al. ................. | 375/260 |
| 2007/0149249 | A1 | 6/2007 | Chen et al. ................... | 455/561 |
| 2007/0171808 | A1* | 7/2007 | Wu et al. ...................... | 370/208 |
| 2007/0230373 | A1* | 10/2007 | Li et al. ........................ | 370/267 |
| 2009/0041087 | A1 | 2/2009 | Yamasuge .................... | 375/130 |

(Continued)

FOREIGN PATENT DOCUMENTS

| | | |
|---|---|---|
| CN | 1703852 A | 11/2005 |
| CN | 1870464 A | 11/2006 |

(Continued)

OTHER PUBLICATIONS

Mondal et al., IEEE 802.16m Sounding Channel Design Proposal, IEEE C802.16m-08/835, Jul. 14, 2008.

(Continued)

*Primary Examiner* — Hassan Phillips
*Assistant Examiner* — Anez Ebrahim
(74) *Attorney, Agent, or Firm* — Imperium Patent Works; Zheng Jin

(57) ABSTRACT

In wireless OFDMA systems, sounding channels are allocated within predefined resource blocks. In a distributed sounding channel allocation scheme, a sounding channel is allocated to meet various design considerations. First, sounding signals do not collide with original pilots transmitted in the same resource block by other mobile stations to achieve good quality channel estimation. Second, sounding pattern does not affect data transmission behavior of other mobile stations in the same resource block. Third, sounding pattern consistency among multiple tiles within each resource block is maintained so that mobile stations do not need to implement additional data mapping rules. In a symbol-based sounding channel allocation scheme, a sounding channel is allocated in the first or the last OFDM symbol of a resource block, while the remaining consecutive OFDM symbols are used for data transmission. The symbol-based sound channel naturally satisfies all design considerations.

20 Claims, 7 Drawing Sheets

U.S. PATENT DOCUMENTS

| | | | |
|---|---|---|---|
| 2009/0122777 A1* | 5/2009 | Tao et al. | 370/343 |
| 2009/0225721 A1* | 9/2009 | Cudak et al. | 370/330 |
| 2009/0274226 A1* | 11/2009 | Mondal et al. | 375/260 |
| 2009/0316811 A1 | 12/2009 | Maeda et al. | 375/260 |
| 2011/0255451 A1* | 10/2011 | Moon et al. | 370/280 |
| 2011/0261806 A1* | 10/2011 | Chun et al. | 370/342 |
| 2012/0213178 A1 | 8/2012 | Mizusawa | 370/329 |

FOREIGN PATENT DOCUMENTS

| | | |
|---|---|---|
| CN | 101162987 A | 4/2008 |
| CN | 101272593 A | 9/2008 |
| CN | 101494528 A | 7/2009 |
| JP | 2007134804 | 5/2007 |
| JP | 2007251747 | 9/2007 |
| JP | 200872706 | 10/2009 |
| TW | 200420054 A | 10/2004 |
| TW | 200611519 A | 4/2006 |
| TW | 200737806 A | 10/2007 |
| TW | 200814593 A | 3/2008 |
| TW | 200832977 A | 8/2008 |
| WO | WO2007053954 | 5/2007 |
| WO | WO2007098450 | 8/2007 |
| WO | WO2008042865 | 4/2008 |
| WO | WO2008050467 | 5/2008 |
| WO | WO2008120925 A1 | 10/2008 |
| WO | WO2009125946 A2 | 10/2009 |
| WO | WO2009137268 | 11/2009 |

OTHER PUBLICATIONS

SIPO, the First Examination Opinion of Chinese patent application 200980100964.0, dated Apr. 1, 2012. (6 pages).

International Search Report and Written Opinion of International Search Authority for PCT/CN2009/076338 dated Apr. 8, 2010 (10 pages).

International Search Report and Written Opinion of International Search Authority for PCT/CN2009/076316 dated Apr. 15, 2010 (11 pages).

R1-063128, Ericsson, "Uplink reference Signals", Nov. 6-10, 2006, Riga, Latvia (5 pages).

R1-070860, NTT Docomo et al. "Closed Loop Antenna Switching in E-Ultra Uplink", Feb. 12-16, 2007, St. Louis, USA (3 pages).

IEEE C802.16m-08/087, S Moon, JS Kwak, et al. "Frame Structure for IEEE 802.16", Jan. 16, 2008 (18 pages).

IEEE C802.16m-08/657r2, IEEE 802.16 Broadband Wireless Access Working Group, M Ho, J Pi et al. Jul. 7, 2008 (12 pages).

IEEE C802.16m-08/349, Dongsheng Yu et al. "Proposal for IEEE 802.16m Uplink Sounding Pilot", May 5, 2008 (12 pages).

IEEE 802.16m-08/943, Fred Vook et al. "Details of UL Channel Sounding Design for Section 11.9 of the SDD", Sep. 5, 2008 (12 pages).

IEEE C802.16m-08/1106r3, Shu Wang et al. "Enhance Downlink Positioning in WimAX/16m", Sep. 5, 2008 (17 pages).

IEEE C802.16m-08/243r1, Sungho Moon et al. "Frame Structures for Legacy-Support and Legacy-Support Disabled Modes", Mar. 17, 2008 (11 pages).

IEEE 802.16m-09/0047, Ron Murias, "System Evaluation Details for IEEE 802.16 IMT-Advanced Proposal", Sep. 23, 2009. (p. 26 line 3-5. p. 31 line 64-65. p. 32 Fig.15 line 52. p. 33 line 1-6 Fig.16).

EPO, office action, EP09836092 dated Jan. 10, 2013 (19 pages).

EPO, office action, EP09836083 dated Jan. 10, 2013 (15 pages).

SIPO, Examination Search Report, 200980101045.5 dated Feb. 5, 2013 (9 pages).

Taiwan IPO, Examination Search Report, 098146374, dated Feb. 6, 2013 (8 pages).

JP office action, JP2011-542663 dated Feb. 12, 2013 (10 pages).

JP office action, JP2011-542661 dated Feb. 5, 2013 (9 pages).

JP Office Action for related JP application 2011542663 dated Oct. 9, 2012(4 pages).

Translation of JPOA for related JP application 2011542663 dated Oct. 9, 2012(6 pages).

IEEE C802.16m-08/1071r2, Proposed SDD Text for UL Control, Dongsheng Ye et al., Sep. 17, 2008(8 pages).

IEEE C802.16m-08835, Sounding Channel Design Proposal, Bishwarup Mondal et al., Jul. 14, 2008(8 pages).

IEEE C802.16m-08/008, Proposed Frame Structure for IEEE 802.16m, Mark Cudak et al., Jan. 16, 2008(14 pages).

IEEE C802.16m-08/471, Uplink Control Structure, Xin Chang et al., May 5, 2008, pp. 21-23(14 pages).

IEEE 802.16m-08/003r6, IEEE 802.16m System Description Document, Shkimbin Hamiti et al., Dec. 12, 2008, p. 108 (3 pages).

IEEE C802.16m-08/615,Proposal for Uplink MIMO Schemes in IEEE 802.16m, Jun Yuan et al., Jul. 7, 2008, pp. 1-8 (9 pages).

IEEE 5802.16m-08/120r1, Proposal for IEEE 802.16m Downlink Symbol Structure Concept, Yuval Lomnitz et al., Mar. 12, 2008, pp. 23,24 (4 pages).

Taiwan Intellectual Property Office has prepared the Examination Opinion of Taiwan patent application 098146381, dated Apr. 19, 2013. (6 pages).

\* cited by examiner

METHOD OF ALLOCATING SOUNDING CHANNEL IN AN OFDMA COMMUNICATIONS SYSTEM

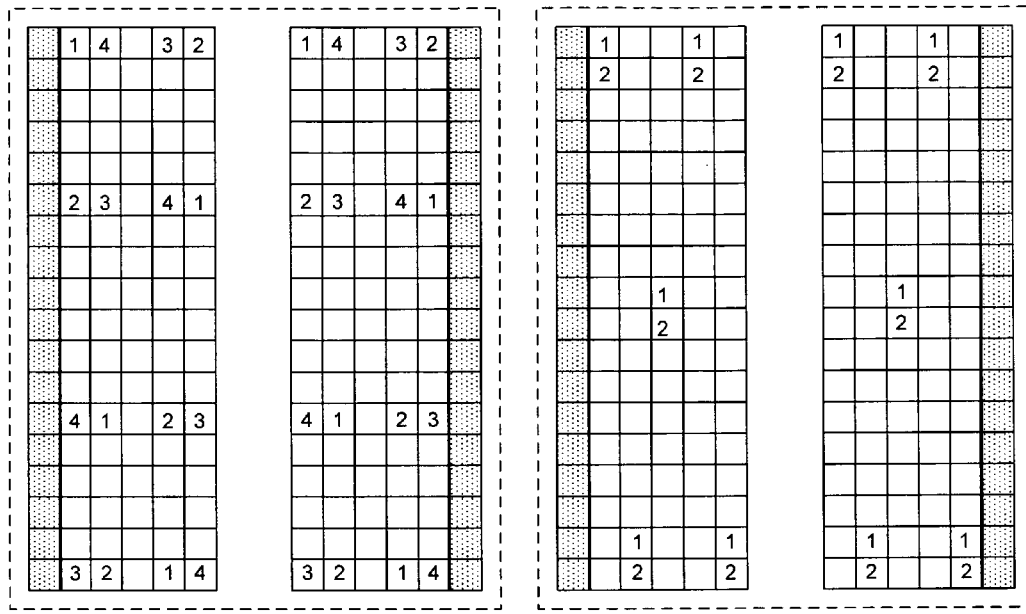
FIG. 5A
FIG. 5B
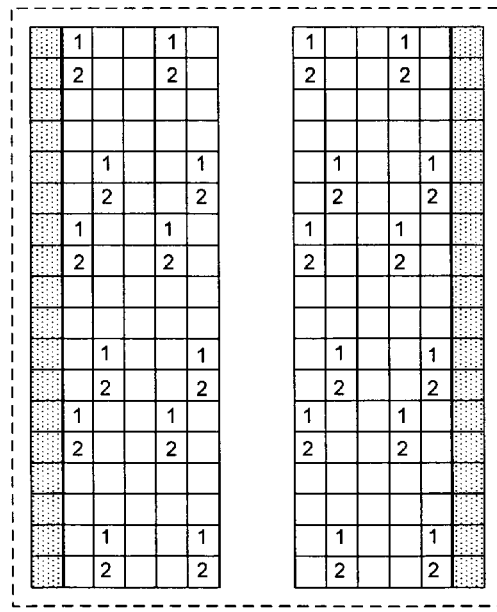
FIG. 5C
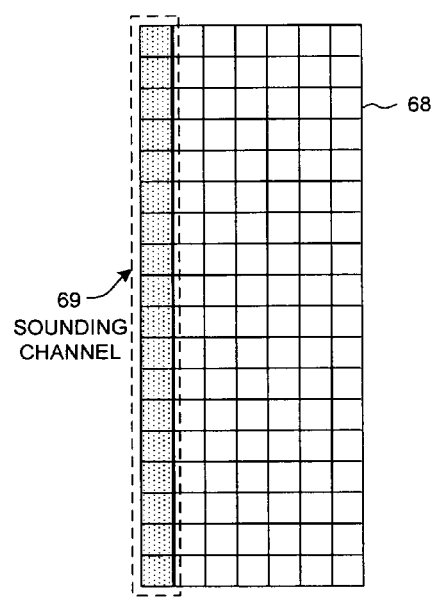
FIG. 6

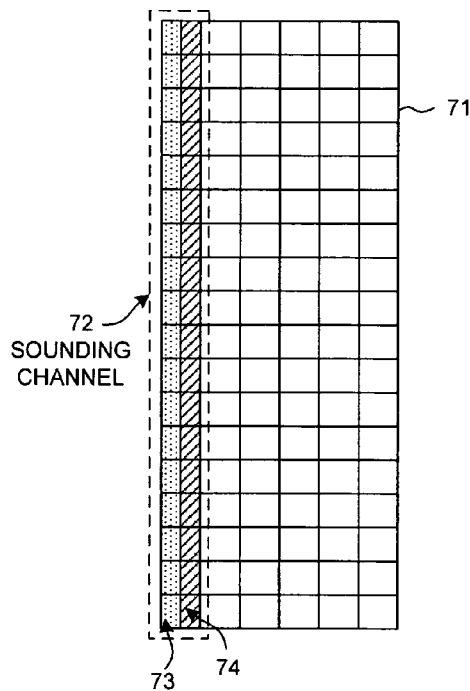
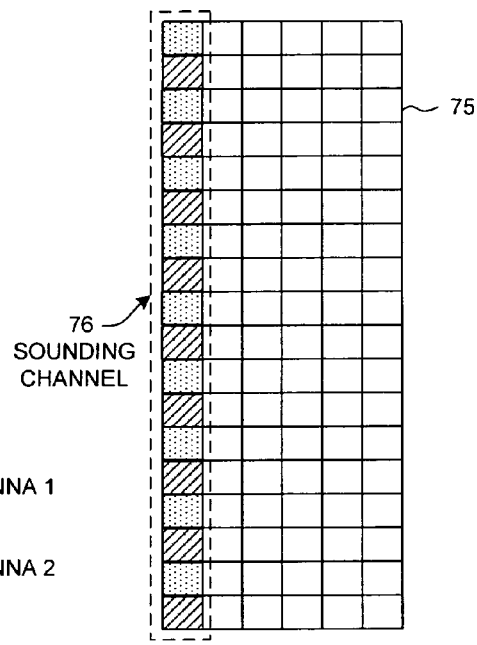
FIG. 7A  FIG. 7B
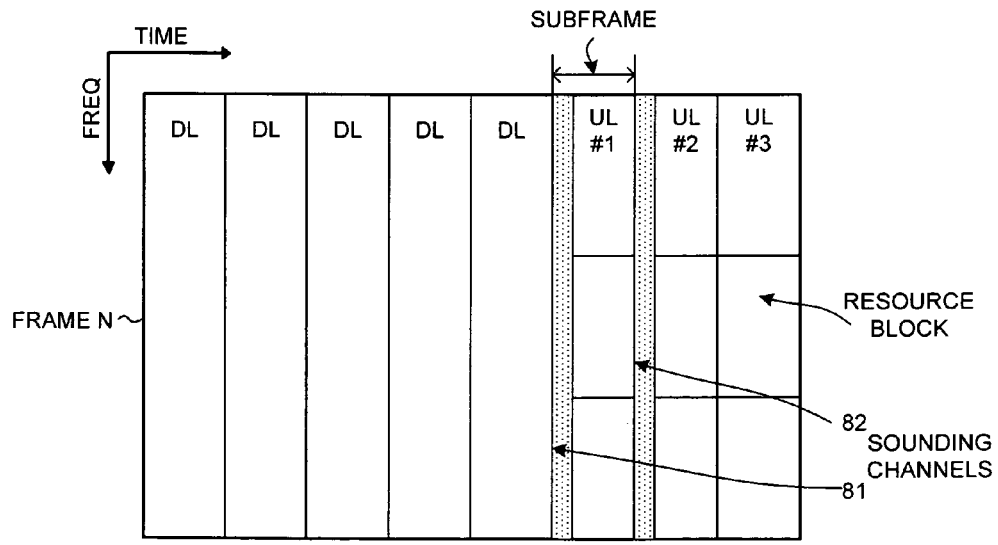
FIG. 8

PHYSICAL STRUCTURE AND DESIGN OF SOUNDING CHANNEL IN OFDMA SYSTEMS

CROSS REFERENCE TO RELATED APPLICATIONS

This application claims priority under 35 U.S.C. §119 from U.S. Provisional Application No. 61/141,814, entitled "UL and DL Sounding Channel Design," filed on Dec. 31, 2008; U.S. Provisional Application No. 61/142,653, entitled "Sounding Channel Designs," filed on Jan. 6, 2009; the subject matter of which is incorporated herein by reference.

TECHNICAL FIELD

The disclosed embodiments relate generally to wireless network communications, and, more particularly, to sounding channel design in wireless orthogonal frequency division multiple access (OFDMA) communication systems.

BACKGROUND

Orthogonal Frequency-Division Multiple Access (OFDMA) is a multi-user version of the Orthogonal Frequency-Division Multiplexing (OFDM) digital modulation technology. In wireless OFDMA systems, however, multi-path is an undesirable common propagation phenomenon that results in radio signals reaching the receiving antenna by two or more paths. Signal variations in amplitude or phase resulted from multipath are also referred as channel response. Transmission techniques, in which a transmitter makes use of the channel response between the transmitter and a receiver, are called close-loop transmission techniques. In MIMO applications, close-loop transmission techniques are much more robust as compared with open-loop MIMO techniques.

One method of providing channel information to the transmitter is via the use of an uplink (UL) sounding channel. Channel sounding is a signaling mechanism where a mobile station transmits sounding signals on an uplink channel (from the mobile station to the base station) to enable a base station to estimate the UL channel response. Channel sounding assumes the reciprocity of uplink and downlink channels, which is generally true in Time Division Duplexing (TDD) systems. Because the frequency bandwidth of the UL transmission encompasses the frequency bandwidth of the DL transmission in TDD systems, UL channel sounding can enable DL close-loop transmissions. UL channel sounding can also enable UL close-loop transmissions in both TDD and FDD systems. For example, the base station can choose the best precoding weights (vectors/matrices) to be used for data transmission from the mobile station.

In wireless OFDMA systems, a resource block is defined as a two-dimensional radio resource region comprising a number of consecutive sub-carriers (also referred as frequency tones) by a number of consecutive OFDM symbols (also referred as time slots). A resource block is the smallest unit for radio resource partition. For both DL and UL transmissions, the IEEE 802.16m specification defines 5-symbol resource block as 18 sub-carriers by five OFDM symbols, 6-symbol resource block as 18 sub-carriers by six OFDM symbols, and 7-symbol resource block as 18 sub-carriers by seven OFDM symbols. For UL transmission, the IEEE 802.16m specification additionally defines 5-symbol resource block as 6 sub-carriers by five OFDM symbols, 6-symbol resource block as 6 sub-carriers by six OFDM symbols, and 7-symbol resource block as 6 sub-carriers by seven OFDM symbols. The 6-sub-carrier resource blocks are further called as a resource tile. Under a fixed number of OFDM symbols, an 18-subcarrier resource block accommodates three tiles. Moreover, the 5-symbol, 6-symbol, and 7-symbol resource blocks are called as type-3, type-1, and type-2 resource blocks, respectively. The IEEE 802.16m specification also defines corresponding pilot patterns for various predefined resource block sizes.

To ensure channel estimation quality of data traffic channel, sounding signals transmitted via an UL sounding channel are not allowed to collide with the original pilots that are allocated in various predefined UL resource blocks. Thus, in wireless OFDMA systems, it is desirable to design and allocate sounding channels based on predefined resource block sizes.

SUMMARY

In OFDMA wireless communication systems, sounding channels are used to estimate channel response of an uplink (UL) channel. In IEEE 802.16m systems, sounding channels are allocated within predefined resource blocks to transmit sounding signals from a mobile station to a base station. A well-designed sounding channel needs to meet various design considerations. First, in order to provide high quality channel estimation for data transmission, sounding signals are not allowed to collide with original pilots transmitted in the same resource block by other mobile stations. Second, it is desirable that sounding pattern does not affect data transmission behavior of other mobile stations in the same resource block. Third, it is also desirable that sounding pattern consistency among multiple tiles within each resource block is maximally maintained such that mobile stations do not need to implement additional data mapping rules.

In one embodiment, a distributed sounding channel allocation scheme is proposed. In one example, a sounding channel is allocated in an 18×6 resource block to satisfy all design considerations. First, sounding pattern does not overlap with any of the predefined pilot patterns such that sounding signals do not collide with original pilots transmitted in the same resource block by other mobile stations. Second, sounding signals are distributed pair-by-pair in the sounding channel so that other mobile stations can apply SFBC encoding for data transmission using the same resource block without additional restriction. Third, sounding pattern remains the same among multiple tiles within each resource block such that the mobile station does not need to implement additional data mapping rules.

In another embodiment, a symbol-based sounding channel allocation scheme is proposed. In a first example, a sounding channel is allocated in the first or the last OFDM symbol of an 18×6 resource block to transmit sounding signals by one or multiple mobile stations, while the remaining five consecutive OFDM symbols are formed to be an 18×5 resource block used for data transmission by other mobile stations. In a second example, a sound channel is allocated in the first or the last OFDM symbol of an 18×7 resource block to transmit sounding signals by one or multiple mobile stations, while the remaining six consecutive OFDM symbols are formed to be an 18×6 resource block used for data transmission by other mobile stations.

A symbol-based sounding channel naturally satisfies all design considerations. First, sounding signals transmitted in the first or last OFDM symbol do not collide with any pilot signals transmitted in the remaining OFDM symbols. Second, the sounding pattern does not limit SFBC-based data transmissions of other mobile station because sounding signals are mapped onto only the first or the last OFDM symbols while data is carried in the remaining OFDM symbols.

Finally, the sounding pattern remains the same among multiple tiles within each resource block. Thus, the symbol-based sounding channel allocation scheme provides coexistence of sounding and pilot signals using existing 802.16m system definitions. Moreover, because only well-defined system definitions are used in the symbol-based sounding scheme, a compatible coexistence of the sounding and the existing data traffic channels is maintained, without inducing any limitation and implementation complexity.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

FIGS. 5A to 5C illustrate examples of symbol-based sounding channels allocated in various 6-symbol resource blocks.

FIG. 6 illustrates that the symbol-based sounding channel allocation scheme can be expanded to 7-symbol resource blocks.

FIG. 7A illustrates that a sounding channel is shared by different antennas using CDM.

FIG. 7B illustrates that a sounding channel is shared by different antennas using FDM.

FIG. 8 illustrates that multiple sounding channels are shared by different antennas of multiple mobile stations using TDM.

DETAILED DESCRIPTION

Reference will now be made in detail to some embodiments of the invention, examples of which are illustrated in the accompanying drawings.

Figure 1:
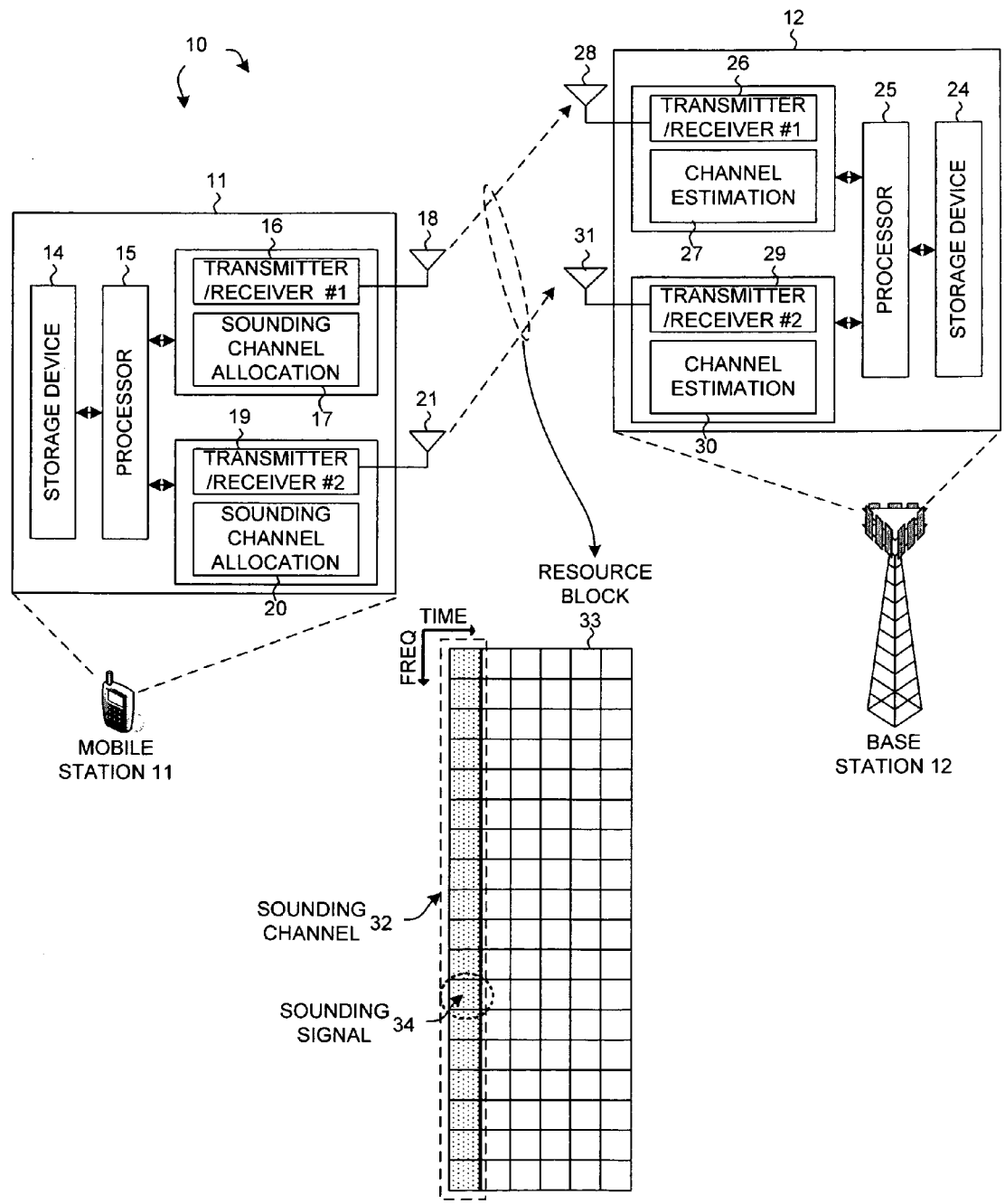
FIG. 1 illustrates a wireless OFDMA system with uplink channel sounding in accordance with one novel aspect.

FIG. 1 illustrates a wireless OFDMA system 10 with uplink channel sounding in accordance with one novel aspect. Wireless OFDMA system 10 comprises a mobile station MS11 and a base station BS12. MS11 comprises a storage device 14, a processor 15, a first sounding channel allocation module 17, a first transmitter/receiver 16 coupled to a first antenna 18, a second sounding channel allocation module 20, a second transmitter/receiver 19 coupled to a second antenna 21. Similarly, BS12 comprises a storage device 24, a processor 25, a first channel estimation module 27, a first transmitter/receiver 26 coupled to a first antenna 28, a second channel estimation module 30, a second transmitter/receiver 29 coupled to a second antenna 31. Base station BS12 and mobile station MS11 communicate with each other by sending and receiving data carried in a series of frames. Each frame comprises a number of downlink (DL) subframes for BS12 to transmit data to MS11, and a number of uplink (UL) subframes for MS11 to transmit data to BS12.

For UL channel estimation, mobile station MS11 transmits sounding signals carried by a sounding channel 32 allocated in a resource block 33. Resource block 33 is a two-dimensional radio resource region comprising a number of consecutive subcarriers or frequency tones (i.e., eighteen) along frequency domain and a number of consecutive OFDM symbols or time slots (i.e., six) along time domain. In the example of FIG. 1, sounding channel 32 is allocated in the first OFDM symbol within resource block 33. The number of subcarriers of sounding channel 32 allocated in resource block 33 is equal to the number of subcarriers (i.e., eighteen) of the resource block. A sounding sequence is then mapped onto sounding channel 32 to be transmitted as multiple sounding signals via resource block 33. Each sounding signal (i.e., sounding signal 34) occupies one frequency tone. Typically, the length of a sounding sequence is the same as the number of subcarriers of a resource block, and the number of sounding signals carried in a sounding channel is thus the same as the number of subcarriers of the resource block. Sometimes, however, a sounding channel may span over multiple resource blocks such that longer sounding sequences may be used. In one novel aspect, sounding channel 32 is allocated with a sounding pattern such that sounding signals transmitted in resource block 33 by MS11 do not collide with pilot signals transmitted in the same resource block by other mobile stations. In addition, the sounding pattern does not affect data transmission behavior of other mobile stations in the same resource block.

Figure 2:
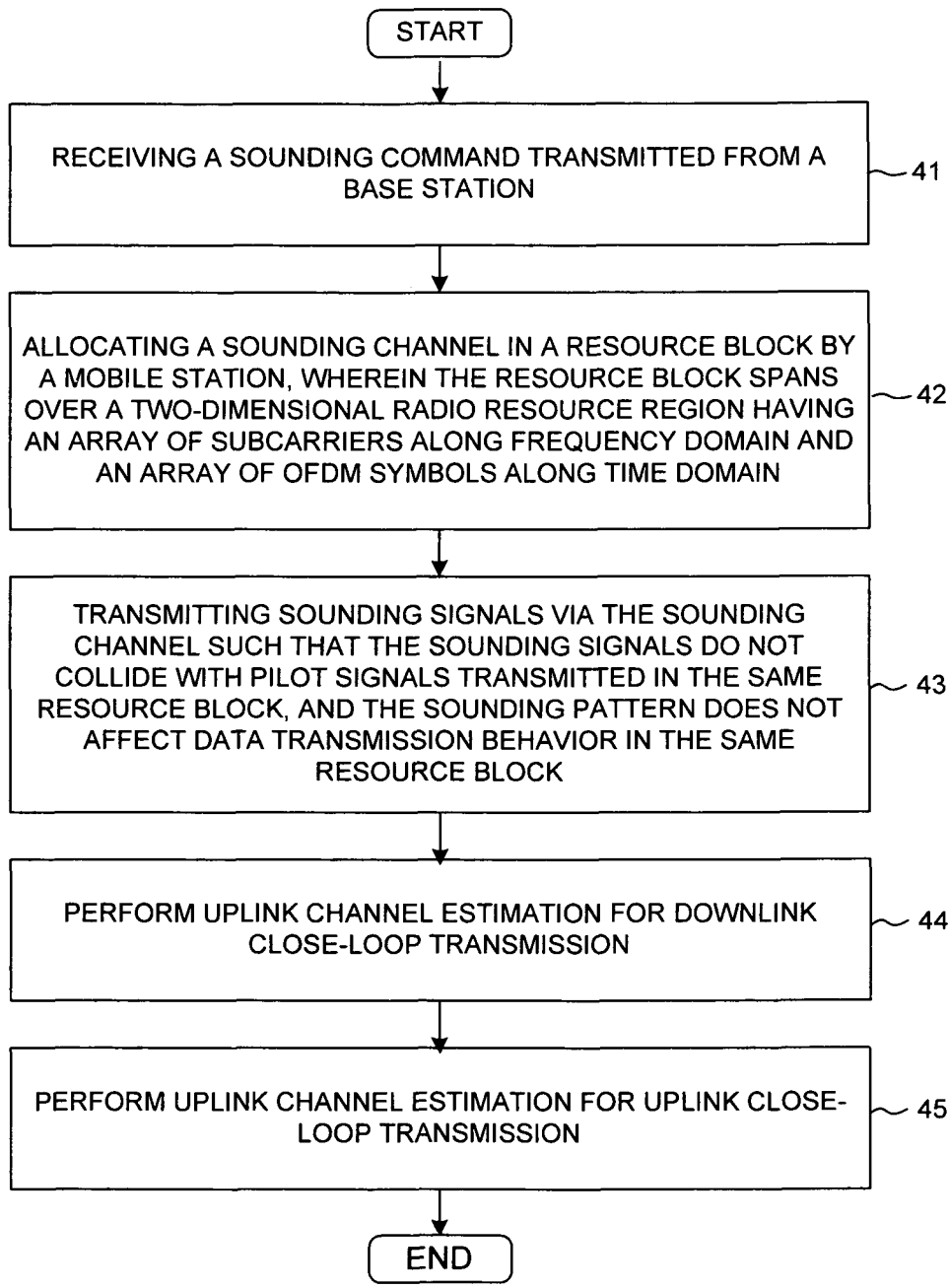
FIG. 2 is a flow chart of a method of uplink channel sounding in accordance with one novel aspect.

FIG. 2 is a flow chart of a method of uplink channel sounding in accordance with one novel aspect. In step 41, a mobile station first receives a sounding command transmitted from a base station before the mobile station starts to perform UL channel sounding. In step 42, the mobile station allocates a physical sounding channel structure within a resource block. In one example, the same sounding channel may span over multiple resource blocks. In step 43, the mobile station maps a sounding sequence onto the allocated sounding channel to be transmitted as multiple sounding signals via the resource block. After the base station receives the sounding signals, the base station performs UL channel estimation for DL close-loop transmission (Step 44). In addition, UL close-loop transmission may also be performed (step 45). For example, the mobile station receives the best precoding weights (vectors/matrices) to be used for data transmission from the base station.

A well-designed sounding channel meets several important sounding channel design considerations. First, in order to provide high quality channel estimation for data transmission, sounding signals are not allowed to collide with original pilots transmitted in the same resource block by other mobile stations. Second, it is desirable that sounding pattern does not affect data transmission behavior of other mobile stations in the same resource block. Third, it is also desirable that sounding pattern consistency among multiple tiles within each resource block is maximally maintained such that mobile stations do not need to implement additional data mapping rules. Two different sounding channel allocation schemes are proposed to meet the above sounding channel design considerations. The details of each sounding channel allocation scheme are now described below with accompanying drawings.

Figure 3:
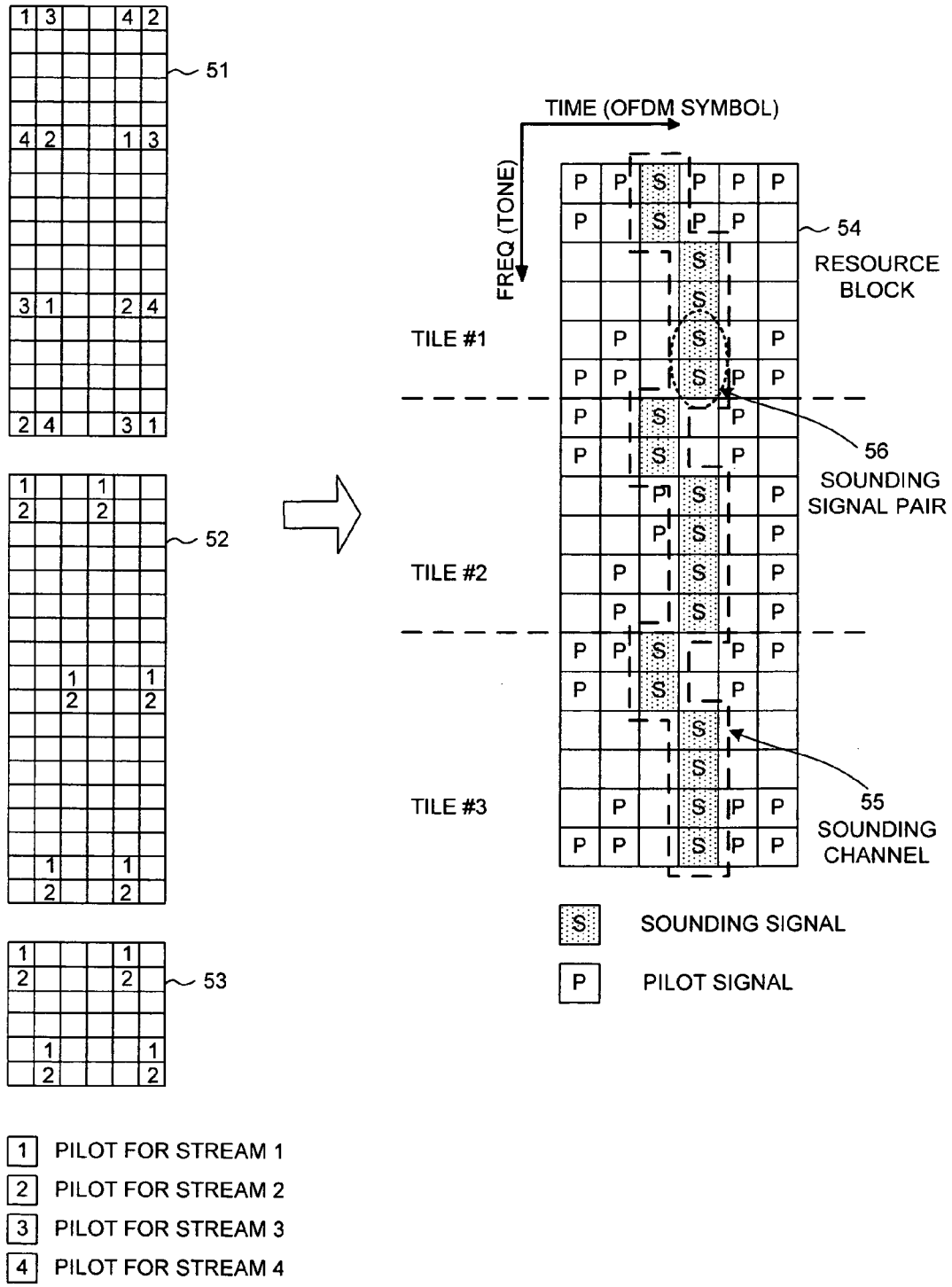
FIG. 3 illustrates one embodiment of a distributed sounding channel allocation scheme.

FIG. 3 illustrates one embodiment of a distributed sounding channel allocation scheme with a distributed sounding channel 55 associated with a distributed sounding pattern. In a distributed sounding allocation scheme, sounding pattern 55 is distributed in different radio resource regions within resource block 54 such that all sounding channel design considerations described above are satisfied.

First, sounding signals transmitted in distributed sounding channel 55 by a mobile station do not collide with any pilot signals transmitted in the same resource block by other mobile stations. In IEEE 802.16m systems, pilot signals are transmitted in predefined pilot patterns in various basic 6-symbol resource blocks (type-1). Based on resource permutation rules, the predefined pilot patterns are categorized into localized and distributed pilot patterns. Localized pilot pattern is used for localized resource blocks, which are assigned to mobile stations without any resource block permutation. On the other hand, distributed pilot pattern is used for distributed resource blocks, which are assigned to mobile stations after resource block permutation. Three examples of different 6-symbol resource blocks 51, 52, and 53 are depicted in FIG. 3. Resource block 51 is an 18×6 resource block with 4-stream localized pilot pattern. Numeric number "1" represents a pilot signal for stream 1, numeric number "2" represents a pilot signal for stream 2, and so on so forth. Similarly, resource block 52 is an 18×6 resource block with 2-stream localized pilot pattern, and resource block 53 is a 6×6 resource block with 2-stream distributed pilot pattern. Because a mobile station may use any of the predefined pilot patterns for data transmission using the same resource block, sounding channel 55 must not overlap with any of the predefined pilot patterns such that sounding signals do not collide with any possible pilot signals. After combining all predefined pilot patterns, resource regions denoted with letter "P" represent all possible pilot signals transmitted in resource block 54 by other mobile stations. Based on the combined pilot pattern, sounding channel 55 is allocated in resource regions denoted with letter "S" in resource block 54. The sounding pattern does not overlap with the combined pilot pattern. Therefore, as illustrated in FIG. 3, sounding signals transmitted by sounding channel 55 do not collide with any possible pilot signals in the same resource block.

Second, sounding pattern 55 does not affect data transmission behavior of other mobile stations in the same resource block. As a basic principle, in order to minimize interference between sounding signals and other data signals, when a sounding signal is transmitted in a specific frequency tone by one antenna, then other antennas put null symbol in the same frequency tone. In many MIMO applications, a mobile station may apply Space Frequency Block Coding (SFBC) encoding algorithm for data transmission. SFBC is a diversity scheme employed by the mobile station to achieve spatial diversity using multiple transmitting antennas. Under SFBC encoding scheme, however, data must be carried in two consecutive frequency tones for transmission. As a result, if sounding signals are not distributed pair-by-pair in sounding channel 55, then it is possible that some of the frequency tones cannot be utilized for SFBC transmission. For example, if one sounding signal is transmitted in one frequency tone, then the neighboring frequency tones cannot be used for SFBC transmission by other mobile stations. In the example of FIG. 3, however, all sounding signals are distributed pair-by-pair (i.e., sounding signal pair 56) in sounding channel 55 such that other mobile stations can apply SFBC encoding for data transmission using the same resource block without additional restriction.

Third, sounding pattern 55 is consistent among multiple tiles within resource block 54. When channel sounding is enabled, in order to minimize interference, a mobile station needs to know the actual sounding pattern so that data symbol will only be mapped in radio resource regions that are non-overlapping with the sounding pattern. Therefore, if the actual sounding pattern changes in different network configuration, then the mobile station needs to have different data-mapping rules for a corresponding sounding pattern. As illustrated in FIG. 3, the 18×6 resource block 54 accommodates three 6×6 tiles. Each tile may be used by different mobile stations for data transmission. For example, tile #1 may be used by mobile station #1, tile #2 may be used by mobile station #2, and tile #3 may be used by mobile station #3 for data transmission. Consequently, if the sounding pattern in each of the tiles is different, then the mobile station needs different data mapping rules when it uses different tiles to transmit data. In the example of FIG. 3, however, sounding pattern 55 is consistent among all three tiles. As a result, mobile station complexity is reduced because the data-mapping rule for each tile is consistent.

Figure 4:
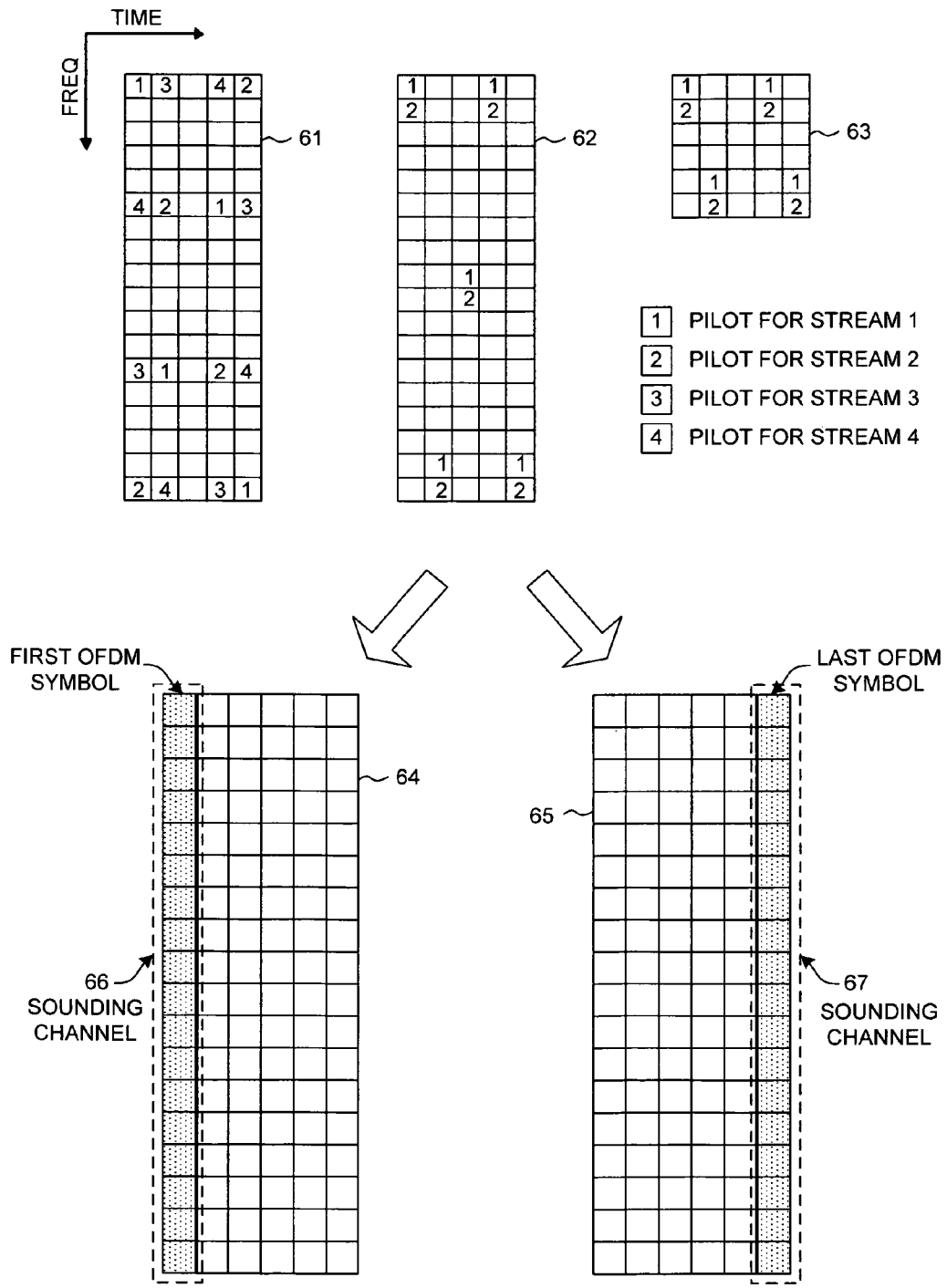
FIG. 4 illustrates one embodiment of a symbol-based sounding channel allocation scheme.

FIG. 4 illustrates one embodiment of a symbol-based sounding channel allocation scheme with symbol-based sounding channels (sometimes also referred as sounding patterns) 66 and 67. As illustrated above with respect to FIG. 3, the IEEE 802.16m specification has predefined different pilot patterns in various 6-symbol resource blocks (type-1). Type-1 resource block is the basic resource block that is most commonly used in IEEE 802.16m systems. In some scenarios, however, the first OFDM symbol of the first DL subframe is often used for synchronization channel, and the last OFDM symbol of the last UL subframe is often used for receive/transmit transition gap. As a result, a 5-symbol resource block is actually used for data transmission. To facilitate data transmission using 5-symbol resource blocks, the IEEE 802.16m specification has also predefined different pilot patterns in various 5-symbol resource blocks (type-3). Three examples of different 5-symbol resource blocks 61, 62, and 63 are depicted in FIG. 4. Resource block 61 is an 18×5 resource block with 4-stream localized pilot pattern. Numeric number "1" represents a pilot signal for stream 1, numeric number "2" represents a pilot signal for stream 2, and so on so forth. Similarly, resource block 62 is an 18×5 resource block with 2-stream localized pilot pattern, and resource block 63 is a 6×5 resource block with 2-stream distributed pilot pattern.

Based on the existing well-defined resource blocks and pilot patterns in the IEEE 802.16m specification, it is observed that if a sounding channel is allocated in the first or the last OFDM symbol of a 6-symbol resource block, then all sounding channel design considerations are naturally satisfied if the remaining 5-symbol resource block is used for data transmission. In the example of 18×6 resource block 64 of FIG. 4, sounding channel 66 is allocated in the first OFDM symbol. In the example of 18×6 resource block 65 of FIG. 4, sounding channel 67 is allocated in the last OFDM symbol. When channel sounding is enabled, if sounding channel 66 or sounding channel 67 is used by mobile stations to transmit sounding signals, then the remaining five consecutive OFDM symbols are formed to be a 5-symbol resource block to be used by other mobile stations for data transmission. On the other hand, when channel sounding is disabled, mobile stations continue to use 6-symbol resource blocks for data transmission. By allocating a sounding channel in either the first or the last OFDM symbol of a 6-symbol recourse block and using the remaining 5-symbol resource block for data transmission, all sounding channel design considerations are naturally satisfied without introducing additional limitation or complexity. First, sounding signals transmitted in the first or last OFDM symbol do not collide with any pilot signals transmitted in the remaining OFDM symbols. Second, the sounding pattern does not limit SFBC-based data transmissions. Finally, the sounding pattern remains the same among multiple tiles within each resource block.

FIGS. 5A to 5C illustrate examples of symbol-based sounding channels allocated in resource blocks with various pilot patterns. In FIG. 5A, an 18×6 resource block with 4-stream localized pilot pattern is used for both sounding signals and data transmission. In FIG. 5B, an 18×6 resource block with 2-stream localized pilot pattern is used for both sounding signals and data transmission. In FIG. 5C, an 18×6 resource block with 2-stream distributed pilot patterns is used for both sounding signals and data transmission. In all the above examples, it can be seen that because sounding channels are allocated in either the first OFDM symbol or the last OFDM symbol, and pilot signals and data are transmitted in the remaining consecutive OFDM symbols. Because 5-symbol pilot patterns and data-mapping rules are already well defined in the IEEE 802.16m specification, such symbol-based sounding channels always allow good coexistence of sounding and pilot signals, without inducing any additional limitation on data transmission behavior or additional complexity on mobile station implementation.

FIG. 6 illustrates that the symbol-based sounding channel allocation scheme can be easily extended to 7-symbol resource blocks (type-2). In an 18×7 resource block 68, which exists in IEEE 80.16m systems with 7 MHz and 8.75 MHz total bandwidths, a sounding channel 69 is allocated in either the first OFDM symbol (or the last OFDM symbol, not shown in FIG. 6) for transmitting sounding signals by one mobile station, while the remaining six consecutive OFDM symbols are formed to be a 6-symbol resource block for data transmission by other mobile stations. This further illustrates that the symbol-based sounding channel allocation scheme provides coexistence of sounding and pilot signals based on existing 802.16m system definition without inducing additional limitation and complexity.

An allocated sounding channel may be shared by different antennas of multiple mobile stations using Code Division Multiplexing (CDM) and/or Frequency Division Multiplexing (FDM). FIG. 7A illustrates that a sounding channel 72 allocated in resource block 71 is shared by antenna 1 and antenna 2 of a mobile station using CDM. In the example of FIG. 7A, antenna 1 of the mobile station maps a sounding sequence 73 onto sounding channel 72, while antenna 2 of the mobile station maps a different sounding sequence 74 onto sounding channel 72. By using different sounding sequences, the same resource region of a sounding channel can be shared by multiple antennas to perform UL channel sounding. FIG. 7B illustrates that a sounding channel 76 allocated in resource block 75 is shared by antenna 1 of the mobile station and antenna 2 of the mobile station using FDM. In the example of FIG. 7B, antenna 1 maps a sounding sequence onto part of the subcarriers (i.e., subcarriers 1, 3, 5, . . . ) within sounding channel 76, while antenna 2 maps the same sounding sequence onto a different part of the subcarriers (i.e., subcarriers 2, 4, 6, . . . ) within sounding channel 76. By using different subcarriers of a sounding channel, the sounding channel can be shared by multiple antennas to perform UL channel sounding. In the above two examples, a sounding channel also can be shared by two mobile stations, each of which only has one antenna to be sounded. If using CDM, the antennas of the two mobile stations use different sounding sequences to perform UL sounding. If using FDM, the antennas of the two mobile stations use different sets of non-overlapping subcarriers to perform UL sounding.

To increase sounding opportunities for different antennas of multiple mobile stations, multiple sounding channels may be allocated across multiple resource blocks and multiple subframes, and be shared using Time Division Multiplexing (TDM). FIG. 8 illustrates multiple sounding channels shared by different antennas of multiple mobile stations using TDM. In the example of FIG. 8, frame N contains three consecutive uplink subframes UL#1, UL#2, and UL#3 followed by five consecutive downlink subframes. Each UL subframe contains three resource blocks along frequency domain. For example, if each resource block is 18×6 in size, then each subframe is 54×6 in size. In subframe UL#1, sounding channel 81 is allocated in the first OFDM symbol. In addition, sounding channel 81 spans over three resource blocks within UL#1. Similarly, in subframe UL#2, sounding channel 82 is allocated in the first OFDM symbol and spans over three resource blocks within UL#2. In one example, a first mobile station uses sounding channel 81 to transmit sounding signals, and a second mobile station uses sounding channel 82 to transmit sounding signals. Because multiple sounding channels are allocated in multiple subframes along time domain, more sounding opportunities are provided for multiple mobile stations.

Figure 9:
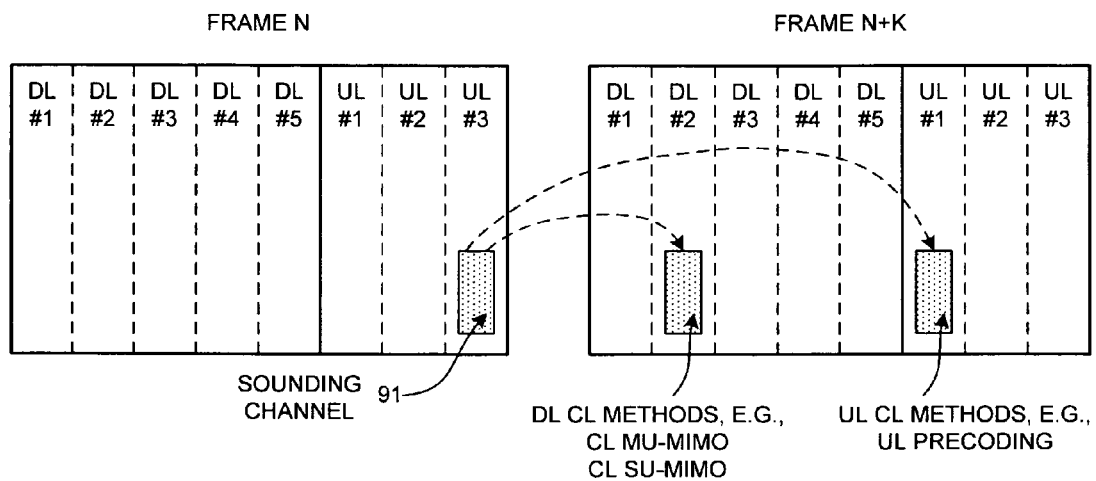
FIG. 9 illustrates how uplink channel sounding is used for both downlink and uplink close-loop transmission.

FIG. 9 illustrates how uplink channel sounding is used for both downlink and uplink close-loop transmission. A base station and a mobile station communicate with each other by sending and receiving data carried in a series of frames. Each frame comprises a number of downlink (DL) subframes for the base station to transmit data to the mobile station, and a number of uplink (UL) subframes for the mobile station to transmit data to the base station. In the example of FIG. 9, the mobile station transmits sounding signals via a sounding channel 91 allocated in UL subframe UL#3 of frame N. The base station receives the sounding signals and performs uplink channel estimation based on the received sounding signals. In a subsequent frame N+K, the base station transmits data in DL subframe DL#2 using a DL close-loop transmission technique chosen based on the channel information from the sounding channel, such as close-loop MU-MIMO or close-loop SU-MIMO. In addition, the mobile station transmits data in UL subframe UL#1 using UL close-loop transmission technique informed by the base station, such as close-loop precoding. By using a well-designed sounding channel such as a distributed or a symbol-based sounding channel proposed above in accordance with the present invention, high quality channel estimation is provided for better close-loop transmissions.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method for providing a sounding pattern of a sounding channel in an OFDMA system, the method comprising:
   allocating the sounding channel in one or more resource blocks by a mobile station, wherein each of the one or more resource blocks spans over a two-dimensional radio resource region having an array of subcarriers along frequency domain and an array of OFDM symbols along time domain; and
   transmitting sounding signals via the sounding channel, wherein the sounding signals do not collide with pilot signals transmitted in the same resource blocks by other mobile stations,
   wherein Space Frequency Block Coding (SFBC) is applied in the same resource block for data transmission, and wherein the sounding pattern does not limit the SFBC-based data transmissions behavior of other mobile stations in the same resource blocks.

2. The method of claim 1, wherein the pilot signals are mapped onto pilot patterns predefined in IEEE 802.16m specification, and wherein the sounding pattern does not overlap with any of the predefined pilot patterns.

3. The method of claim 1, wherein the resource block is partitioned into multiple tiles along frequency domain, and wherein the sounding pattern remains the same for each of the multiple tiles.

4. The method of claim 1, wherein the resource block has eighteen subcarriers along frequency domain and six OFDM symbols along time domain.

5. The method of claim 4, wherein the resource block is partitioned into three tiles along frequency domain, and wherein six sounding signals are pair-by-pair distributed such that each sounding signal pairs are non-overlapping in frequency domain.

6. The method of claim 1, wherein the sounding channel is shared among different transmit antennas of multiple mobile stations by at least one of code division multiplexing, frequency division multiplexing, and time division multiplexing.

7. The method of claim 1, wherein the sounding channel spans across multiple resource blocks, and wherein multiple sounding channels are allocated in multiple uplink subframes to provide multiple sounding opportunities for different transmit antennas of multiple mobile stations.

8. A method for providing a sounding channel in an OFDMA system, the method comprising:
   allocating the sounding channel in one or more resource blocks by a mobile station, wherein each of the one or more resource blocks spans over a two-dimensional radio resource region having an array of subcarriers along frequency domain and an array of OFDM symbols along time domain;
   and transmitting sounding signals via the sounding channel such that the sounding signals occupy a single OFDM sounding symbol within the resource block, wherein the single OFDM sounding symbol is located either in the first OFDM symbol or in the last OFDM symbol within the resource block along the time domain,
   and wherein Space Frequency Block Coding (SFBC) is applied in the same resource block for data transmission, and wherein the sounding pattern does not limit the SFBC-based data transmissions behavior of other mobile stations in the same resource blocks.

9. The method of claim 8, wherein the resource block is a six-symbol resource block, and wherein the remaining five consecutive symbols are formed to be a five-symbol resource block for data transmission.

10. The method of claim 8, wherein the resource block is a seven-symbol resource block, and wherein the remaining six consecutive symbols are formed to be a six-symbol resource block for data transmission.

11. The method of claim 8, wherein the sounding channel spans across multiple resource blocks, and wherein multiple sounding channels are allocated in multiple uplink subframes to provide multiple sounding opportunities for different transmit antennas of mobile stations.

12. A mobile station in an OFDMA system, the mobile station comprising:
    a transmitter that transmits sounding signals via a sounding channel having a sounding pattern; and
    a sounding channel allocation module for allocating the sounding channel in one or more resource blocks, wherein each of the one or more resource blocks spans over a two-dimensional radio resource region having an array of subcarriers along frequency domain and an array of OFDM symbols along time domain,
    wherein the sounding channel is allocated such that the sounding signals do not collide with pilot signals transmitted in the same resource blocks by other mobile stations, wherein Space Frequency Block Coding (SFBC) is applied in the same resource block for data transmission, and wherein the sounding pattern does not limit the SFBC-based data transmissions behavior of other mobile stations in the same resource blocks.

13. The mobile station of claim 12, wherein the pilot signals are mapped onto pilot patterns predefined in IEEE 802.16m specification, and wherein the sounding pattern does not overlap with any of the predefined pilot patterns.

14. The mobile station of claim 12, wherein Space Frequency Block Coding (SFBC) is applied in the same resource block for data transmission, and wherein the sounding pattern does not limit the SFBC-based data transmissions.

15. The mobile station of claim 12, wherein the resource block is partitioned into multiple tiles along frequency domain, and wherein the sounding pattern remains the same for each of the multiple tiles.

16. The mobile station of claim 12, wherein the sounding channel is shared among different transmit antennas of multiple mobile stations by at least one of code division multiplexing, frequency division multiplexing, and time division multiplexing.

17. The mobile station of claim 12, wherein the sounding channel spans across multiple resource blocks, and wherein multiple sounding channels are allocated in multiple uplink subframes to provide multiple sounding opportunities for different transmit antennas of multiple mobile stations.

18. The mobile station of claim 12, wherein the sounding signals occupy a single OFDM sounding symbol within the resource block, and wherein the single OFDM sounding symbol is located either in first OFDM symbol or in the last OFDM symbol within the resource block along the time domain.

19. The mobile station of claim 18, wherein the resource block is a six-symbol resource block, and wherein the remaining five consecutive symbols are formed to be a five-symbol resource block for data transmission.

20. The mobile station of claim 18, wherein the resource block is a seven-symbol resource block, and wherein the remaining six consecutive symbols are formed to be a six-symbol resource block for data transmission.

* * * * *